（12）United States Patent
Wu et al.

(10) Patent No.: US 8,599,878 B2
(45) Date of Patent: Dec. 3, 2013

(54) WIRELESS COMMUNICATION APPARATUS, HEADER COMPRESSION METHOD THEREOF, AND HEADER DECOMPRESSION METHOD THEREOF

(75) Inventors: Chih-Chiang Wu, Taichung County (TW); Kanchei Loa, Taipei (TW); Shu-Tsz Liu, Taipei (TW)

(73) Assignee: Institute for Information Industry, Taipei (TW)

( * ) Notice: Subject to any disclaimer, the term of this patent is extended or adjusted under 35 U.S.C. 154(b) by 326 days.

(21) Appl. No.: 12/843,882

(22) Filed: Jul. 27, 2010

(65) Prior Publication Data
US 2011/0019695 A1    Jan. 27, 2011

Related U.S. Application Data

(60) Provisional application No. 61/228,629, filed on Jul. 27, 2009.

(51) Int. Cl.
*H04J 3/18* (2006.01)
(52) U.S. Cl.
USPC .............................. 370/477; 370/392; 455/72
(58) Field of Classification Search
USPC ......... 370/338, 389, 328, 329, 330, 392, 429, 370/471, 477; 455/72
See application file for complete search history.

(56) References Cited

U.S. PATENT DOCUMENTS

| 2003/0007512 | A1 | 1/2003 | Tourunen et al. |
| 2004/0001508 | A1* | 1/2004 | Zheng et al. ............... 370/466 |
| 2009/0109924 | A1 | 4/2009 | Sato |
| 2010/0322151 | A1* | 12/2010 | Racz et al. ............... 370/328 |

OTHER PUBLICATIONS

Office Action by the Taiwan patent office for the Taiwanese counterpart application to the present US application, Jul. 10, 2013, 10 pages including translation.

* cited by examiner

*Primary Examiner* — Dady Chery
(74) *Attorney, Agent, or Firm* — Skaar Ulbrich Macari, P.A.

(57) ABSTRACT

Wireless communication apparatuses, header compression methods thereof, and header decompression method thereof are provided. The header compression method enables the transceiver to establish a tunnel for a user equipment, enables the processing unit to receive a first packet, enables the processing unit to generate a second packet comprising an outer header set and the first packet, enables the processing unit to replace the outer header set of the second packet with a replaced header, and enables the transceiver to transmit the second packet by the tunnel according to an identity recorded in the replaced header. The header decompression method decompresses the header compressed by the header compression method.

28 Claims, 12 Drawing Sheets

WIRELESS COMMUNICATION APPARATUS, HEADER COMPRESSION METHOD THEREOF, AND HEADER DECOMPRESSION METHOD THEREOF

PRIORITY

This application claims the benefit of U.S. Provisional Application Ser. No. 61/228,629, filed on Jul. 27, 2009, which is hereby incorporated by reference.

FIELD

The present invention relates to wireless communication apparatuses, header compression methods thereof, and header decompression methods thereof. More particularly, the wireless communication apparatuses, header compression methods thereof, and header decompression methods of the present invention adopt a replacement mechanism and/or a skip mechanism to compress/decompress headers in a packet.

BACKGROUND

Wireless communication technologies are widely used in nowadays. FIG. 1A illustrates the schematic view of a conventional wireless communication system 1, which comprises a user equipment 11, a relay station 13, a base station 15, and a serving gateway 17. The user equipment 11 is wirelessly connected to the relay station 13, the relay station 13 is wirelessly connected to the base station 15, and the base station 15 is wiredly connected to the serving gateway 17. The relay station 13 extends the serving coverage of the serving gateway 17 so that a user equipment that is not in the coverage of the base station 15 but in the coverage of the relay station 13, such as the user equipment 11, can access the services provided by the serving gateway 17.

Although the introduction of the relay station 13 extends the serving coverage of the serving gateway 17, the radio link between the relay station 13 and the base station 15 is burdened with extra headers. FIG. 1B illustrates a packet 102 that the relay station 13 receives from the user equipment 11, while FIG. 1C illustrates a packet 104 that the relay station 13 transmitted to the base station 15. The packet 104 comprises a relay station header and the packet 102. Since radio resource is scare, the relay station header of the packet 104 burdens the radio link between the relay station 13 and the base station 15.

The burden of a header added by the relay station 13 becomes heavy when a packet being transmitted is a Voice over Internet Protocol (VoIP) packet. FIG. 1D illustrates a schematic view of a VoIP packet 106 transmitted by the relay station 13. The VoIP packet 106 comprises an outer header set 106a, an inner header set 106b, and a payload of voice data 106c. The relay station 13 adds the outer header set 106a to the inner header set 106 and the payload of voice data received from the user equipment 11. The payload of voice data 106c is only 30 bytes. The inner header set 106b is 40 bytes or 60 bytes, wherein the Internet Protocol (IP) header contributes 20 bytes (IPv4) or 40 bytes (IPv6), the User Datagram Protocol (UDP) header contributes 8 bytes, and the Real Time Protocol (RTP) header contributes to 12 bytes. The outer header set 106a is 36 bytes or 56 bytes, wherein the Internet Protocol (IP) header contributes 20 bytes (IPv4) or 40 bytes (IPv6), the UDP header contributes 8 bytes, and the GPRS Tunneling Protocol (GTP) header contributes to 8 bytes. Obviously, both the outer header set 106a and inner header set 106b occupy great percentages in the VoIP packet 106.

A Robust Header Compression (RoHC) method is commonly used to compress a header or a header set of a packet in order to ease the burden on a radio link. The RoHC method cooperates with a profile defining which kind of header should be compressed by which method. FIG. 1E illustrates a compressed packet 110 compressed by an RoHC method on the VoIP packet 106. The compressed packet 110 comprises a compressed outer header set 108, the inner header set 106b, and payload of voice data 106c, wherein the compressed outer header set 108 comprises an RoHC header 108a, a compressed header 108b related to the IP header and the UDP header of the outer header set 106a, and the GTP-U header of the outer header set 106a. After compression, the compressed outer header set 108 has 13 bytes (the RoHC header 108a has 3 bytes, the compressed header 108b has 2 bytes, and the GTP-U header has 8 bytes). It is noted that the compression ratio is not good enough. In addition, current RoHC method can only compress one set of headers, so the inner header set cannot be compressed to further reduce the length of the headers.

The RoHC method can be modified to compress both the outer header set and the inner header set. To achieve that, a new profile has to be designed so that all types of headers in the outer header set and inner header set are included. FIG. 1F illustrates a compressed packet 114 compressed by a modified RoHC method on the VoIP packet 106. The compressed packet 114 comprises a compressed header set 112 and the payload of voice data 106c. The compressed header set 112 comprises an RoHC header 112a, a compressed outer header 112b, and a compressed inner header 112c. After compression, RoHC header 112a has 3 bytes, the compressed outer header 112b has 4 bytes, and the compressed inner header has 2 bytes. Although the size of the compressed header 112 is reduced to 9 bytes, an extra overhead of designing a new profile is required.

According to the above descriptions, a header compression method, a corresponding header decompression method and wireless communication apparatus using them are needed.

SUMMARY

An objective of certain embodiments of the present invention is to provide a header compression method for use in a wireless communication apparatus. The wireless communication apparatus comprises a processing unit and a transceiver. The header compression method comprises the following steps of: (a) enabling the transceiver to establish a tunnel for a user equipment, (b) enabling the processing unit to receive a first packet, (c) enabling the processing unit to generate a second packet comprising an outer header set and the first packet, the outer header set being related to the wireless communication apparatus, (d) enabling the processing unit to replace the outer header set of the second packet with a replaced header, the replaced header being shorter than the outer header set and recording an identity corresponding to a data flow of the user equipment, and (e) enabling the transceiver to transmit the second packet by the tunnel according to the identity recorded in the replaced header.

Another objective of certain embodiments of the present invention is to provide a header compression method for use in a wireless communication apparatus. The wireless communication apparatus comprises a processing unit and a transceiver. The header compression method comprises the following steps of: (a) enabling the transceiver to establish a tunnel for a user equipment, (b) enabling the processing unit to receive a first packet, (c) enabling the processing unit to generate a second packet comprising an outer header set and the first packet, the outer header set being related to the wireless communication apparatus and comprising a first header and a GTP-U header, the GTP-U header recording an identity corresponding to a data flow of the user equipment, (d) enabling the processing unit to compress the first header by Robust Header Compression (RoHC) method, and (e) enabling the transceiver to transmit the second packet by the tunnel according to the identity recorded in the GTP-U header.

Another objective of certain embodiments of the present invention is to provide a header decompression method for use in a wireless communication apparatus. The wireless communication apparatus comprises a processing unit and a transceiver. The header decompression method comprises the following steps of: (a) enabling the transceiver to establish a tunnel for a user equipment, (b) enabling the processing unit to receive a packet from a lower layer of a PDCP layer, the packet comprising a replaced header, the replaced header recording an identity of a data flow of the user equipment, (c) enabling the processing unit to read the identity recorded in the replaced header, and (d) enabling the processing unit to generate an outer header set of the packet from the replaced header according to the identity, wherein the replaced header is shorter than the outer header set.

Yet another objective of certain embodiments of the present invention is to provide a header decompression method for use in a wireless communication apparatus. The wireless communication apparatus comprises a processing unit and a transceiver. The header decompression method comprises the following steps of: (a) enabling the transceiver to establish a tunnel for a user equipment, (b) enabling the processing unit to receive a packet from a lower layer of a PDCP layer, the packet comprising an RoHC header, a compressed outer header set, a GTP-U header, the GTP-U header recording an identity corresponding to a data flow of the user equipment, and (c) enabling the processing unit to decompress the compressed outer header set according to the RoHC header.

A further objective of certain embodiments of the present invention is to provide a wireless communication apparatus comprising a transceiver and a processing unit. The transceiver is configured to establish a tunnel for a user equipment. The processing unit is configured to receive a first packet, generate a second packet comprising the first packet and an outer header set related to the wireless communication apparatus, and replace the outer header set of the second packet with a replaced header, wherein the replaced header is shorter than the outer header set and records an identity corresponding to a data flow of the user equipment. The transceiver is further configured to transmit the second packet by the tunnel according to the identity recorded in the replaced header.

A further objective of certain embodiments of the present invention is to provide a wireless communication apparatus comprising a transceiver and a processing unit. The transceiver is configured to establish a tunnel for a user equipment. The processing unit is configured to receive a first packet, generate a second packet comprising an outer header set and the first packet, wherein the outer header set is related to the wireless communication apparatus and comprises a first header and a GTP-U header, the GTP-U header recording an identity corresponding to a data flow of the user equipment. The processing unit is further configured to compress the first header by RoHC method and the transceiver is further configured to transmit the second packet by the tunnel according to the identity recorded in the GTP-U header.

Yet a further objective of certain embodiments of the present invention is to provide a wireless communication apparatus comprising a transceiver and a processing unit. The transceiver is configured to establish a tunnel for a user equipment. The processing unit is configured to receive a packet from a lower layer of a PDCP layer, wherein the packet comprises a replaced header and the replaced header records an identity of a data flow of the user equipment. The processing unit is further configured to read the identity recorded in the replaced header and generate an outer header set of the packet from the replaced header according to the identity, wherein the replaced header is shorter than the outer header set.

Yet a further objective of certain embodiments of the present invention is to provide a wireless communication apparatus comprising a transceiver and a processing unit. The transceiver is configured to establish a tunnel for a user equipment. The processing unit is configured to receive a packet from a lower layer of a PDCP layer, wherein the packet comprises an RoHC header, a compressed outer header set, a GTP-U header and the GTP-U header records an identity corresponding to a data flow of the user equipment. The processing unit is further configured to decompress the compressed outer header set according to the RoHC header.

In particular embodiments, the present invention figures out the fields in the outer header set that can be obtained once a tunnel is established or can be inferred once a compressed packet is received. Then, the outer header set is replaced by a replaced header. The replaced header ignores these kinds of information and includes only necessary information. In one of the alternative kind of approaches a replaced header is not used. Instead, the outer header set is compressed by the RoHC method. Although the outer header set is compressed, the GTP-U header is not compressed because it carries necessary information. Particular embodiments of the present invention my also provide a skip mechanism so as to skip the outer header set and then compresses the inner header set. Consequently, the burden on the radio link between the relay station and the base station can be reduced.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

The present invention relates to wireless communication apparatuses, header compression methods thereof, and header decompression methods thereof. The wireless communication apparatuses may be a relay station, a base station, or the like. In the following descriptions, the present invention will be explained with reference to various example embodiments; nevertheless, these example embodiments are not intended to limit the present invention to any specific environment, embodiment, example, applications, or particular implementations described in these example embodiments. Therefore, these descriptions are only provided for purpose of illustration but not to limit the present invention. It should be appreciated that elements unrelated directly to the present invention are omitted from the example embodiments and the attached drawings.

Figure 1A:
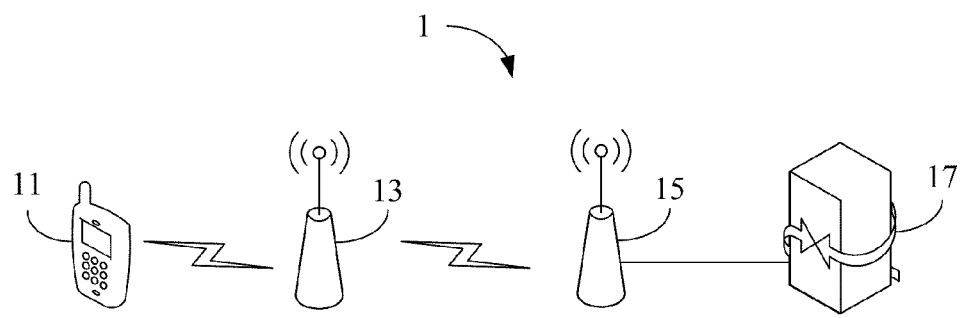
FIG. 1A illustrates a conventional wireless communication system.
Figure 1B:
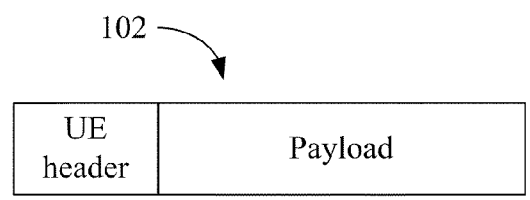
FIG. 1B illustrates a packet that the relay station receives from the user equipment.
Figure 1C:
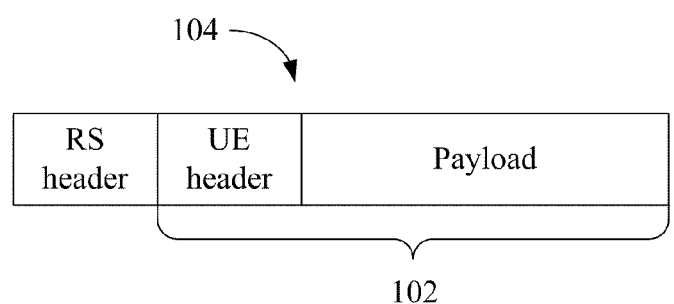
FIG. 1C illustrates a packet that the relay station transmitted to the base station.
Figure 1D:
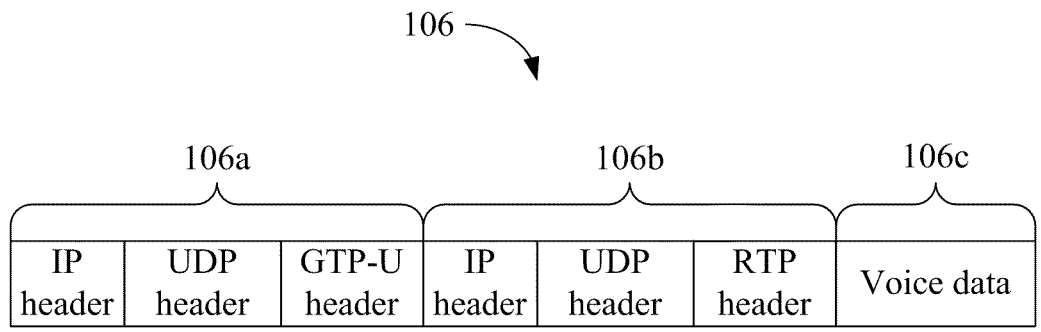
FIG. 1D illustrates a schematic view of a VoIP packet transmitted by the relay station.
Figure 1E:
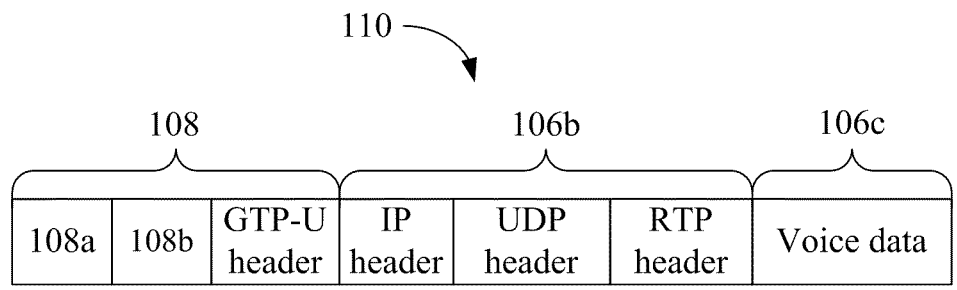
FIG. 1E illustrates a compressed packet compressed by an RoHC method on the VoIP packet.
Figure 1F:
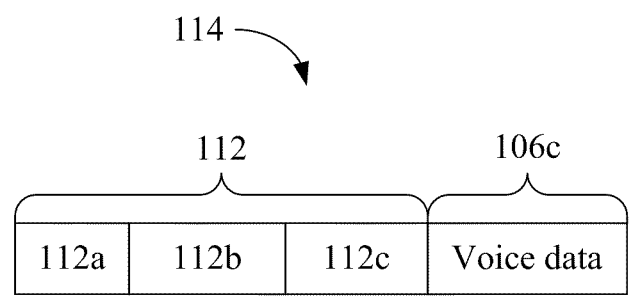
FIG. 1F illustrates a compressed packet compressed by a modified RoHC method on the VoIP packet.
Figure 2A:
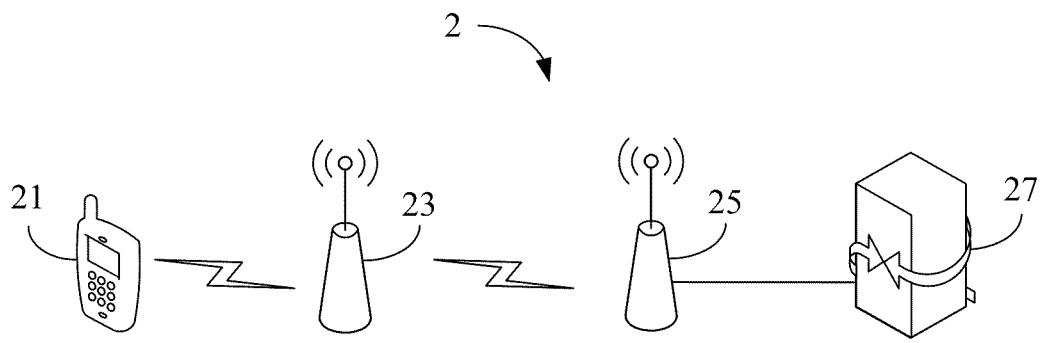
FIG. 2A illustrates a wireless communication system in a first embodiment.
Figure 2B:
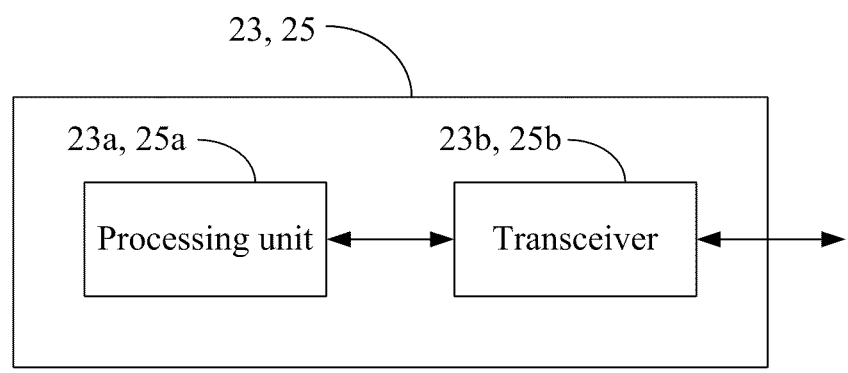
FIG. 2B illustrates schematic views of a relay station and a base station in the first embodiment.

FIG. 2A illustrates a first embodiment of the present invention, which is a wireless communication system 2. The wireless communication system 2 comprises a user equipment 21, a relay station 23, a base station 25, and a serving gateway 27. The user equipment 21 is wirelessly connected to the relay station 23, the relay station 23 is wirelessly connected to the base station 25, and the base station 25 is wiredly connected to the serving gateway 27. As drawn in FIG. 2B, the relay station 23 comprises a processing unit 23a and a transceiver 23b, while the base station 25 comprises a processing unit 25a and a transceiver 25b. The processing units 23a, 25a may be any of various processors, central processing units (CPUs), microprocessors, or other computing devices known to people skilled in the art. In addition, the transceivers 23b, 25b may be any of various transceivers known to people skilled in the art. The wireless communication system 2 conforms to the 3rd Generation Partnership Project (3GPP) Long Term Evolution (LTE) standard.

In this embodiment, the header compression and decompression are described from the viewpoints of uplink and downlink. The details of the uplink are described first. At first, the transceiver 23b of the relay station 23 and the transceiver 25b of the base station 25 cooperate with each other to establish a tunnel for the user equipment 21 so that can be served by the serving gateway 27 through the relay station 23 and the base station 25. Since the wireless communication system 2 conforms to the LTE standard, the tunnel is a GTP-U tunnel. After the creation of the tunnel, both the relay station 23 and the base station 25 obtain some static information. The details of the static information will be described later.

Figure 2C:
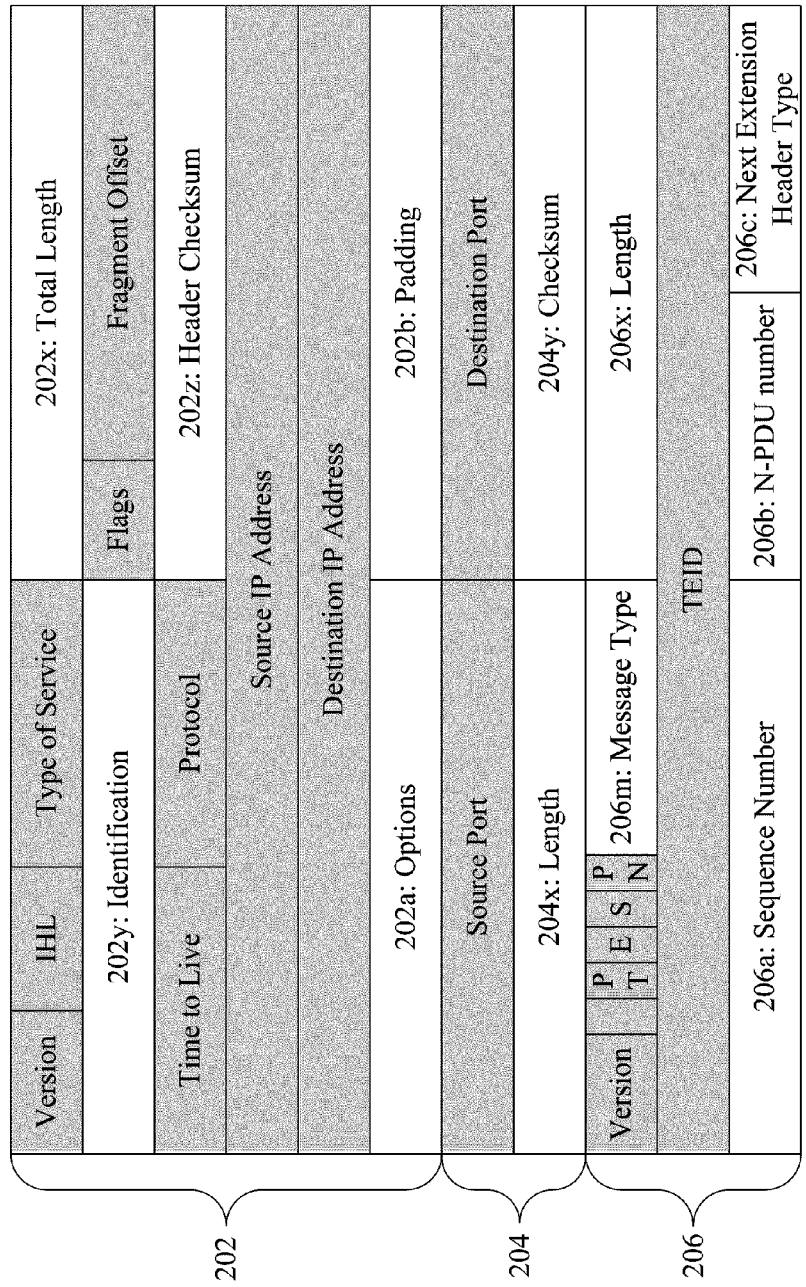
FIG. 2C illustrates an outer header set in the first embodiment.

Next, the transceiver 23b of the relay station 23 receives a first packet from the user equipment 21 at a lower layer of a Packet Data Convergence Protocol (PDCP) layer, wherein the first packet comprises a compressed inner header set and a payload. The compressed inner header set was compressed by a Robust Header Compression (RoHC) method, so the processing unit 23a decompresses the compressed inner header set in the first packet by the RoHC method. Then, the processing unit 23a of the relay station 23 receives the first packet and generates a second packet comprising an outer header set related to the relay station 23 and the first packet. In this embodiment, the outer header set comprises an Internet Protocol version four (IPv4) header 202, a User Datagram Protocol (UDP) header 204, and a GPRS Tunneling Protocol (GTP) header 206 as drawn in FIG. 2C. It is noted that the outer header set may comprise other types of header and the present invention does not limit the number of headers in the outer header set.

Each of the IPv4 header 202, the UDP header 204, and the GTP-U header 206 comprises a plurality of fields. There are four types of the fields: not used, static, inferred, and dynamic. The not used fields include the options field 202a and the padding field 202b in the IPv4 header 202 and the sequence number field 206a, N-PDU number field 206b, and next extension header type field 206c in the GTP-U header 206. These fields are not used in the LTE standard. The static fields are the fields that can be obtained once the tunnel is established, which are shown in grey color in FIG. 2C. In other words, the aforementioned static information obtained by both the relay station 23 and the base station 25 after the creation of the tunnel are the static fields in the IPv4 header 202, UDP header 204, and the GTP-U header 206. The inferred fields record information that can be inferred after receiving a compressed packet. The inferred fields include the total length field 202x, the identification field 202y, and the header checksum field 202z in the IPv4 header, the length field 204x and the checksum field 204y in the UDP header, and the length field 206x in the GTP-U header 206. The dynamic field records information that varies from packet to packet, and only the message type field 206m in the GTP-U header 206 is a dynamic field.

According to the above description, most of the fields of the outer header set (i.e. the IPv4 header 202, the UDP header 204, and the GTP-U header 206 in this embodiment) record information that can be obtained once a tunnel is established or can be inferred once a compressed packet is received. Consequently, the relay station 23 in this embodiment will not transmit these kinds of information in order to reduce the burden from the radio link between the relay station 23 and the base station 25. Instead, the relay station 23 replaces the outer header set of the second packet with a replaced header, which is shorter than the outer header set and records an identity corresponding to a data flow of the user equipment. Two examples of the replaced header are given below.

Figure 2D:
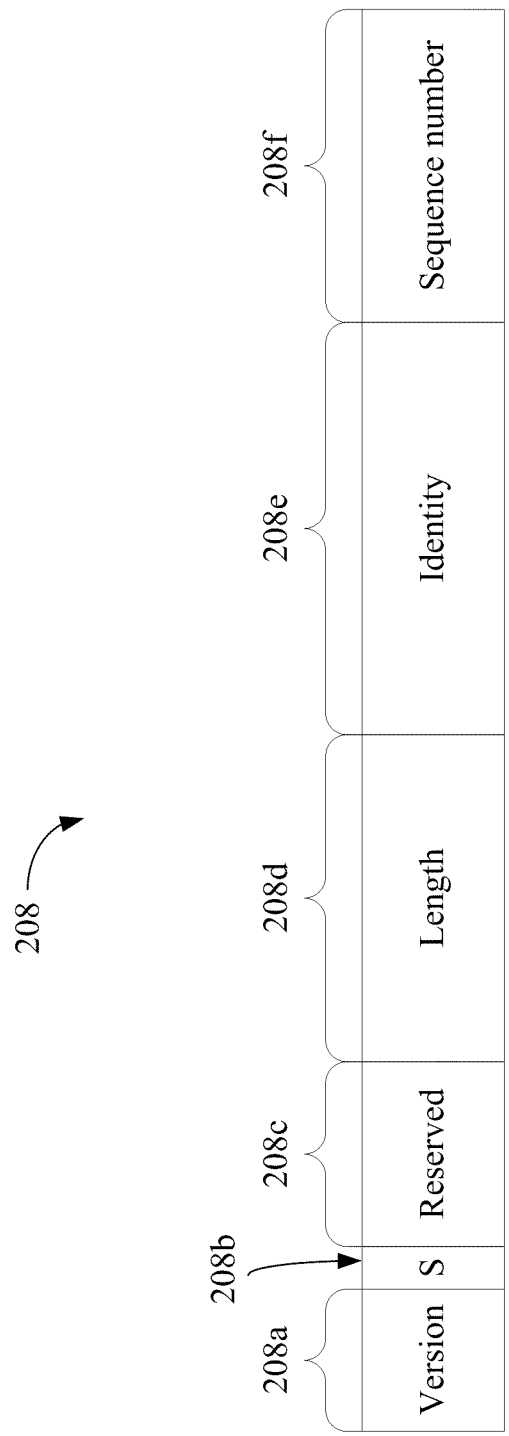
FIG. 2D illustrates a multiplex header in the first embodiment.

FIG. 2D illustrates an example of the replaced header, which is named as a multiplex header 208 for convenience. The multiplex header 208 has six fields, including a version field 208a of 3 bits, a sequence number flag 208b of 1 bit, a reserved field 208c of 4 bits, a length field 208d of 2 bytes, an identity field 208e of 1 to 4 bytes, and a sequence number field 208f of 2 bytes. The sequence number field 208f is not present if the sequence number flag 208b is set to '0'; otherwise, it is present. The reserved field 208c is for future use. The length field 208d indicates the length of the multiplex header 208. The identity field 208e corresponds to the user equipment 21;

specifically, it records a data flow between the user equipment 21 and the serving gateway 27. The sequence number field 208f records a sequence number so that the received packets can be kept in sequence. By using the sequence number field 208f, the base station 25 can directly use the sequence number to create new sequence number for each data flow.

Figure 2E:
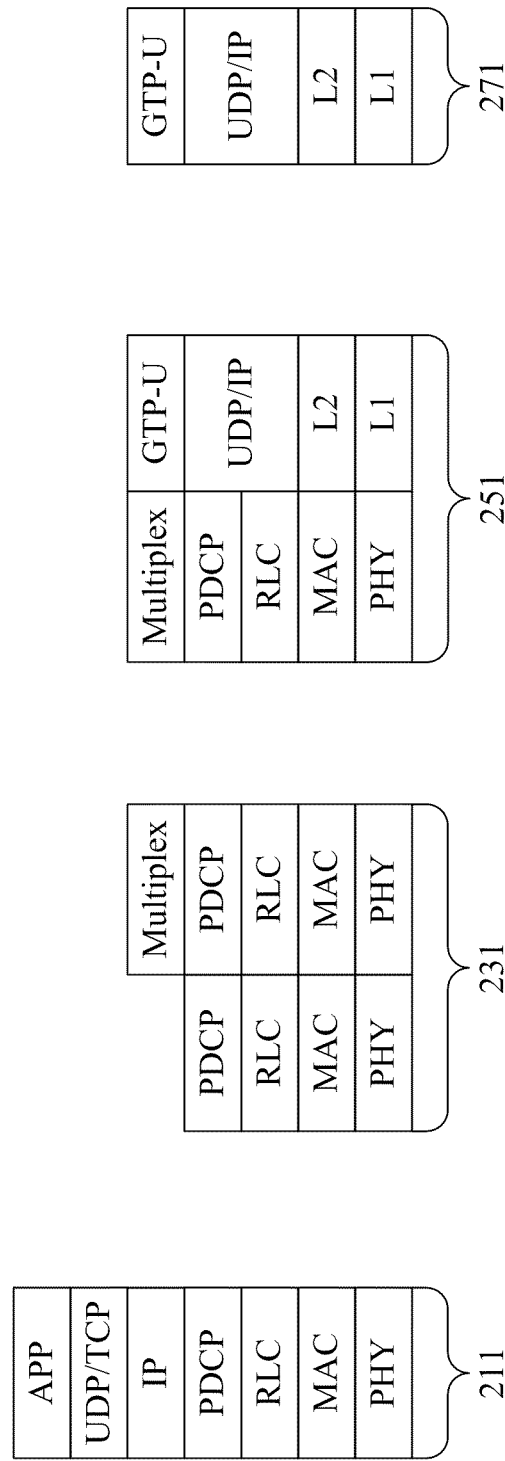
FIG. 2E illustrates a protocol stack when the replaced header is the multiplex header.

After the relay station 23 replaces the outer header set of the second packet with the replaced header, the processing unit 23a determines whether the second packet comprises an uncompressed inner header set. If it is yes, the processing unit 23a skips the replaced header of the second packet according to the length recorded in the replaced header and then compresses the inner header set of the second packet. Afterwards, the transceiver 23b transmits the second packet to the base station 25 by the tunnel according to the identity recorded in the replaced header. In addition, the transceiver 23b transmits a Radio Resource Control (RRC) signal carrying the message type to the base station 25. If the second packet does not comprise an uncompressed inner header set, the transceiver 23b directly transmits the second packet and the RRC signal to the base station 25. FIG. 2E illustrates a protocol stack of when the replaced header is the multiplex header, wherein the protocol stacks 211, 231, 251, and 271 respectively correspond to the user equipment 21, relay station 23, base station 25, and serving gateway 27. It is noted that the upper layers of the PDCP layer in the relay station 23 and the base station 25 are changed to the multiplex layer.

Figure 2F:
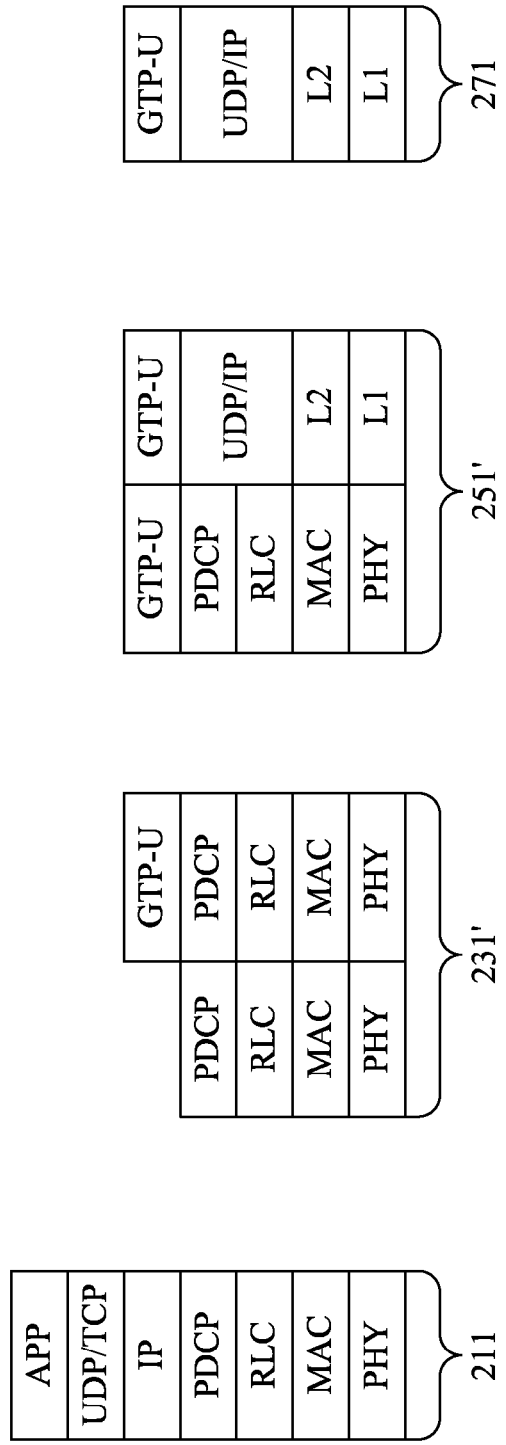
FIG. 2F illustrates a protocol stack when the replaced header is the GTP-U header.

Another example of the replaced header is a GTP-U header as described. The Tunnel End Identifier (TEID) field of the GTP-U header can be used to record the identity corresponding to the data flow of the use equipment 21. The GTP-U header plays the same role as the multiplex header. The difference part is that the GTP-U header has the message type field 206m, so the transceiver 23b does not have to transmit the RRC signal carrying the message type when the replaced header is the GTP-U header. FIG. 2F illustrates a protocol stack of when the replaced header is the GTP-U header, wherein the protocol stacks 211, 231', 251', and 271 respectively correspond to the user equipment 21, relay station 23, base station 25, and serving gateway 27. It is noted that the upper layers of the PDCP layer in the relay station 23 and the base station 25 are changed to the GTP-U layer.

In this embodiment, the first packet is received from the user equipment 21 by the relay station 23, so there is a compressed inner header set added by the user equipment. The relay station 23 in this embodiment decompresses the compressed inner header set and then compresses it again. In other embodiments, the relay station 23 may do nothing to the inner header; that is, the relay station 23 may simply add the outer header set to the first packet and then replace the outer header set by a replaced header. It is also possible that the relay station 23 has to generate its own packet and transmit its own packet to the base station. For this kind of packet, there is no inner header set, so the relay station 23 also simply adds the outer header set to the packet and then replaces the outer header set by a replaced header.

From the viewpoint of the base station 25, the transceiver 25b receives the second packet and the RRC signal from the relay station 23. The processing unit 25a receives the second packet from a lower layer of the PDCP layer. It is noted that the second packet comprises a replaced header, a compressed inner header set, and a payload. The replaced header records an identity of a data flow of the user equipment and a length of the replaced header.

The processing unit 25a reads the length and the identity recorded in the replaced header, determines that the second packet comprises the compressed inner header set, skips the replaced header according to the length of the replaced header, and decompresses the compressed inner header set in the second packet. Thereafter, the processing unit 25a further generates (i.e. recreate) an outer header set of the second packet from the replaced header according to the identity. It is noted that the processing unit 25a can generates (i.e. recreate) the outer header set from the replaced header because most of the fields of the outer header sets can be obtained once the tunnel is established or can be inferred once the second packet is received as mentioned. If the second packet does not comprise the compressed inner header set, the processing unit 25a will not perform the operations related to the inner header set and generates the outer header set directly. After the generation of the outer header set of the second packet, the transceiver 25b transmits the second packet to the serving gateway 27 by the tunnel according to the identity of a data flow of the user equipment.

When it comes to the downlink scenario, the operations performed by the base station 25 are similar to the operations performed by the relay station 23 in the uplink scenario and the operations performed by the relay station 23 are similar to the operations performed by the base station 25 in the uplink scenario.

According to the above descriptions, the first embodiment replaces an outer header set of a packet with a replaced header. The replaced header can be a multiplex header or a GTP-U header. Since the length of the replaced header is much shorter than the outer header set, so the burden of the radio link can be reduced.

A second embodiment of the present invention is the wireless communication system 2 that uses another approach to compress and decompress the headers of a packet. The wireless communication system 2 conforms to the LTE standard. The header compression and decompression are described from the viewpoints of uplink and downlink as well.

Figure 3A:
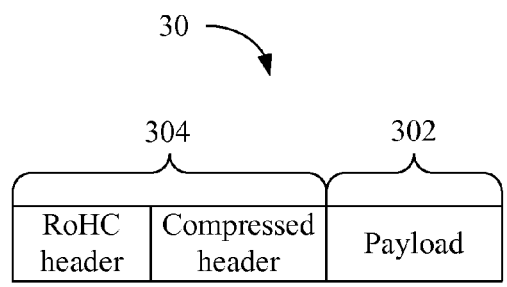
FIG. 3A illustrates a schematic view of a first packet in a second embodiment.

The details of the uplink are described first. At first, the transceiver 23b of the relay station 23 and the transceiver 25b of the base station 25 cooperate with each other to establish a tunnel for the user equipment 21 so that can be served by the serving gateway 27 through the relay station 23 and the base station 25. Since the wireless communication system 2 conforms to the LTE standard, the tunnel is a GTP-U tunnel. Next, the transceiver 23b of the relay station 23 receives a first packet 30 from the user equipment 21 at a lower layer of a PDCP layer. As shown in FIG. 3A, the first packet 30 comprises a compressed inner header set 304 and a payload 302. The compressed inner header set was compressed by a Robust Header Compression (RoHC) method and has a RoHC header and a compressed header. The processing unit 23a decompresses the compressed inner header set 304 in the first packet 30 by the RoHC method. The decompressed inner header set comprises an IP header, a UDP header, and a Real Time Protocol (RTP) header.

Figure 3B:
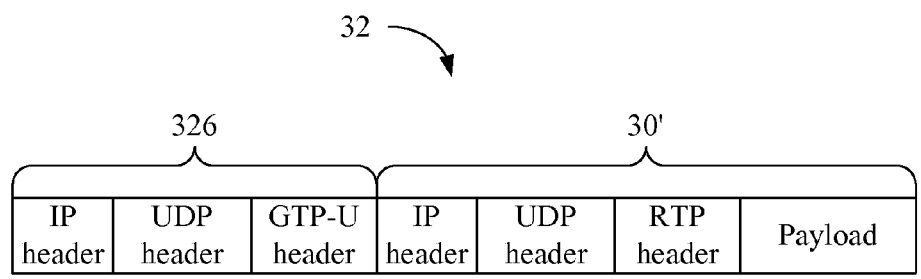
FIG. 3B illustrates a schematic view of a second first packet in the second embodiment.

Then, the processing unit 23a of the relay station 23 receives the first packet. Thereafter, the processing unit 23a generates a second packet 32, which comprises an outer header set 326 and the first packet 30' (the inner header set of the first packet 30' has been decompressed) as shown in FIG. 3B. The outer header set 326 comprises a GTP-U header and two other headers. Since the wireless communication system 2 conforms to the LTE standard, the two other headers in the outer header set 326 are an IP header and a UDP header. It is noted that the GTP-U header records an identity corresponding to the user equipment 21 and a length of the GTP-U header.

Figure 3C:
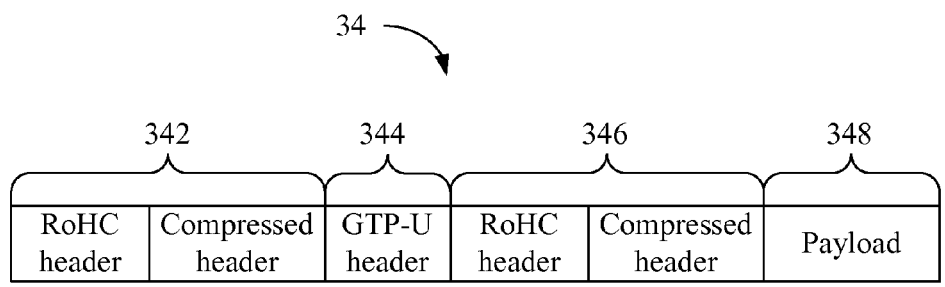
FIG. 3C illustrates a schematic view of a second packet whose inner header set and outer header set are compressed.

Then, the processing unit 23a compresses the two other headers (i.e. the IP header and the UDP header) in the outer header set 326 by the RoHC method. Next, the processing unit 23a skips the outer header set (i.e. the compressed two other headers and the GTP-U header) of the second packet according to the length recorded in the GTP-U header. Then, the processing unit 23a compresses the inner header set of the second packet by the RoHC method. FIG. 3C illustrates the second packet 34 after the processing unit 23a compresses both the inner header set and the outer header set. Specifically, the processed second packet 34 comprises a compressed outer header set 342, a GTP-U header 344, a compressed inner header set 346, and the payload 348. Afterwards, the transceiver 23b transmits the second packet by the tunnel according to the identity recorded in the GTP-U header.

In this embodiment, the first packet 30 is received from the user equipment 21 by the relay station 23, so there is a compressed inner header set 304 added by the user equipment 21. The relay station 23 in this embodiment decompresses the compressed inner header set and then compresses it again. In other embodiments, the relay station 23 may do nothing to the compressed inner header set 304, and then simply adds the outer header set to the first packet 30 and compresses the outer header set. It is also possible that the relay station 23 has to generate its own packet and transmit its own packet to the base station 25. For this kind of packet, there is no inner header set, so the relay station 23 also simply adds the outer header set to the packet and then compressed the outer header set.

From the viewpoint of the base station 25, the transceiver 25b receives the second packet 34 from the relay station 23. The processing unit 25a enables its PDCP layer to receive the second packet 34 from a lower layer of the PDCP layer. The processing unit 25a reads the length and the identity of the user equipment 21 recorded in the GTP-U header, determines that the second packet 34 comprises the compressed inner header set 346, skips the GTP-U header 344 according to the length recorded in the GTP-U header, and decompresses the compressed inner header set 346 in the second packet 34. Then, the processing unit 25a decompresses the compressed outer header set 342 according to the RoHC header.

When it comes to the downlink scenario, the operations performed by the base station 25 are similar to the operations performed by the relay station 23 in the uplink scenario and the operations performed by the relay station 23 are similar to the operations performed by the base station 25 in the uplink scenario.

According to the above descriptions, the second embodiment compresses an outer header set except a GTP-U header of a packet with a replaced header. The compressed outer header set is also much shorter than the original outer header set.

Figure 4A:
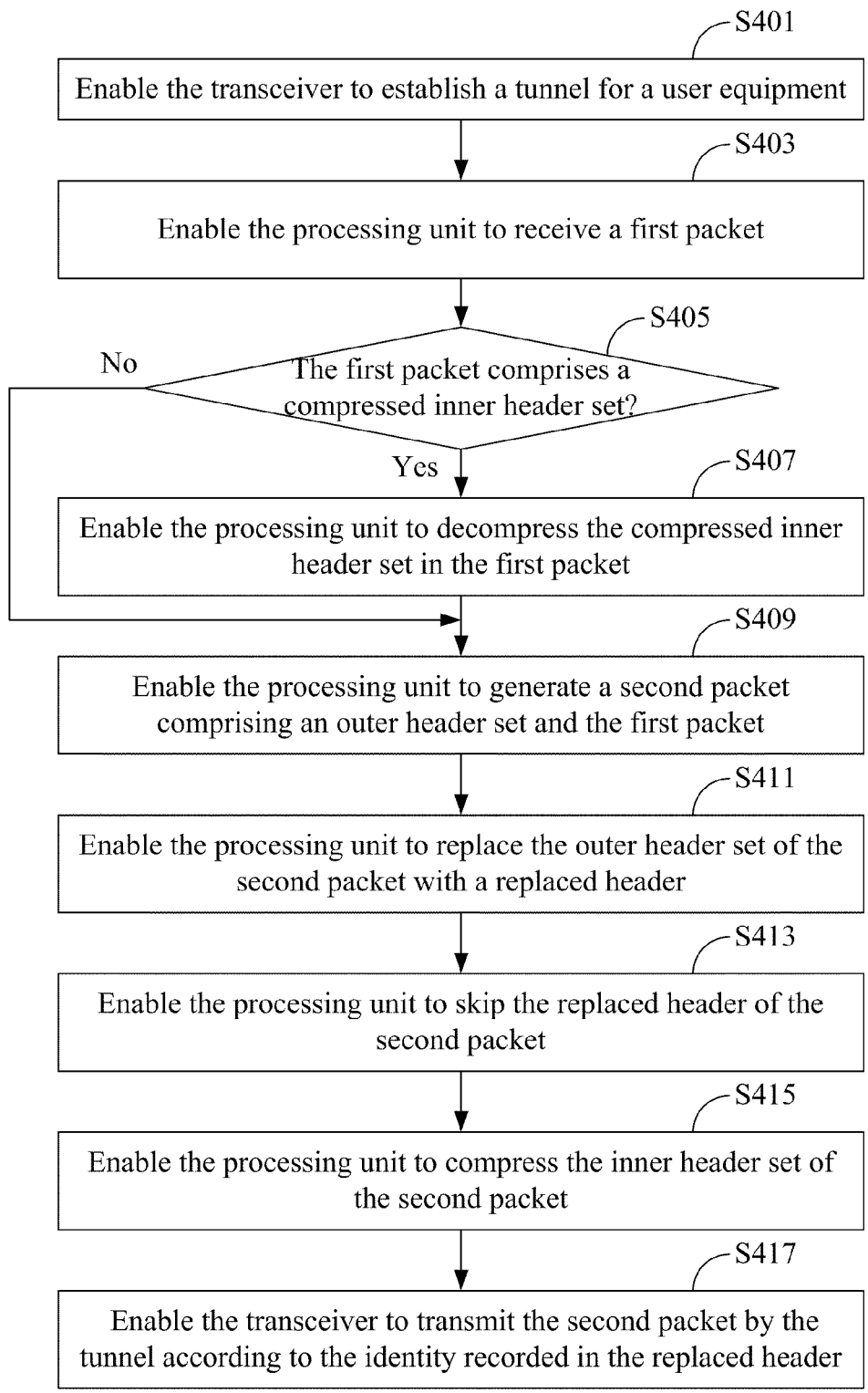
FIG. 4A illustrates a flowchart of the third embodiment.

A third embodiment of the present invention is a header compression method, which can be used in a wireless communication apparatus, such as the relay station 23 and the base station 25 in the first embodiment. The wireless communication apparatus comprises a processing unit and a transceiver. The flowchart of the header compression method is illustrated in FIG. 4A.

First, the header compression method executes step S401 to enable the transceiver to establish a tunnel for a user equipment. Next, step S403 is executed to enable the processing unit to receive a first packet. Step S405 is executed to enable the processing unit to determine whether the first packet comprises a compressed inner header set. If the first packet comprises a compressed inner header set and a payload, step S407 is executed to enable the processing unit to decompress the compressed inner header set in the first packet. Afterwards, step S409 is executed to enable the processing unit to generate a second packet comprising an outer header set and the first packet, wherein the outer header set is related to the wireless communication apparatus. If it is no in step S405, the header compression method proceeds to step S409 directly.

The header compression method proceeds to step S411 to enable the processing unit to replace the outer header set of the second packet with a replaced header, wherein the replaced header is shorter than the outer header set and records an identity corresponding to a data flow of the user equipment. It is noted that the replaced header may be the multiplex header or the GTP-U header in the first embodiment. The replaced header records a length of the replaced header. Following that, the header compression method executes step S413 to enable the processing unit to skip the replaced header of the second packet according to the length of the replaced header. Step S415 is then executed to enable the processing unit to compress the inner header set of the second packet. Thereafter, step S417 is executed to enable the transceiver to transmit the second packet by the tunnel according to the identity recorded in the replaced header.

When the wireless communication system conforms to the LTE standard, the tunnel is a GTP-U tunnel, the outer header set comprises at least one of an IP header, a UDP header, a GTP-U header, and the combination thereof, and the inner header set comprises at least one of an IP header, a UDP header, a RTP header, and the combination thereof.

In addition to the aforesaid steps, the third embodiment can also execute all the compression operations set forth in the first embodiment. How the third embodiment executes these operations will be readily appreciated by those of ordinary skill in the art based on the explanation of the first embodiment, and thus will not be further described herein.

A fourth embodiment of the present invention is a header decompression method, which can be used in a wireless communication apparatus comprising a processing unit and a transceiver, such as the relay station 23 and the base station 25 in the first embodiment. The header decompression method corresponds to the header compression method in the third embodiment.

Figure 4B:
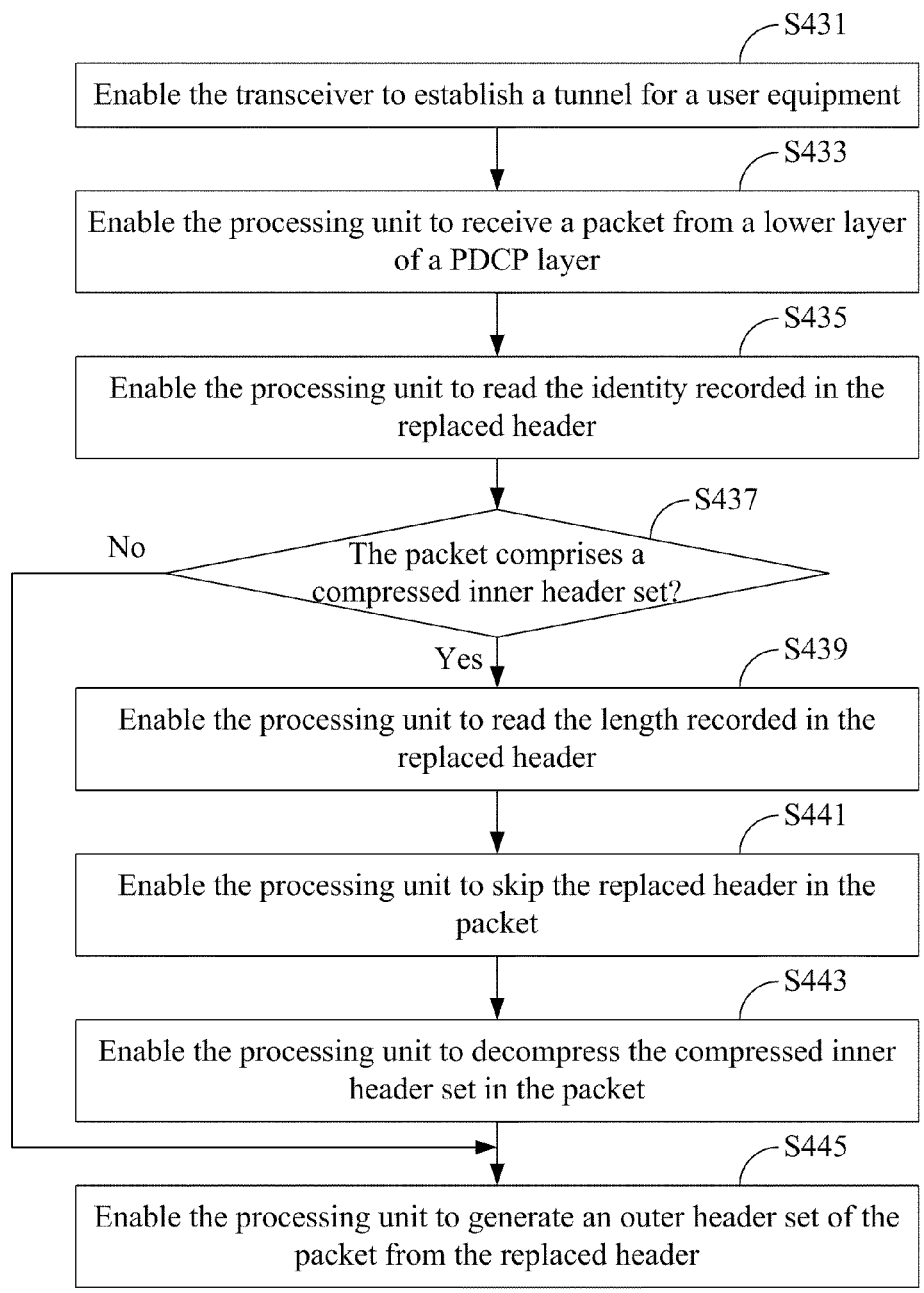
FIG. 4B illustrates a flowchart of the fourth embodiment.

The flowchart of the header decompression method is illustrated in FIG. 4B. First, step S431 is executed to enable the transceiver to establish a tunnel for a user equipment. Next, step S433 is executed to enable the processing unit to receive a packet from a lower layer of a PDCP layer, wherein the packet comprises a replaced header and the replaced header records an identity of a data flow of the user equipment. Following that, the header decompression method executes step S435 to enable the processing unit to read the identity recorded in the replaced header.

Step S437 is executed next to enable the processing unit to determine whether the packet comprises a compressed inner header set. If it is yes, the header decompression method executes step S439 to enable the processing unit to read the length recorded in the replaced header, executes step S441 to enable the processing unit to skip the replaced header according to the length of the replaced header, and executes step S443 to enable the processing unit to decompress the compressed inner header set in the packet. Afterwards, step S445 is executed to enable the processing unit to generate an outer header set of the packet from the replaced header according to the identity, wherein the replaced header is shorter than the outer header set. If it is no in the step S437, the header decompression method proceeds to step S445 directly.

Similarly, when the wireless communication system conforms to the LTE standard and the replaced header is a GTP-U header or a multiplex header, the tunnel is a GTP-U tunnel. Furthermore, the outer header set comprises at least one of an IP header, a UDP header, a GTP-U header, and the combination thereof and the inner header set comprises at least one of an IP header, a UDP header, an RTP header, and the combination thereof.

In addition to the aforesaid steps, the fourth embodiment can also execute all the decompression operations set forth in the first embodiment. How the fourth embodiment executes these operations will be readily appreciated by those of ordinary skill in the art based on the explanation of the first embodiment, and thus will not be further described herein.

Figure 5A:
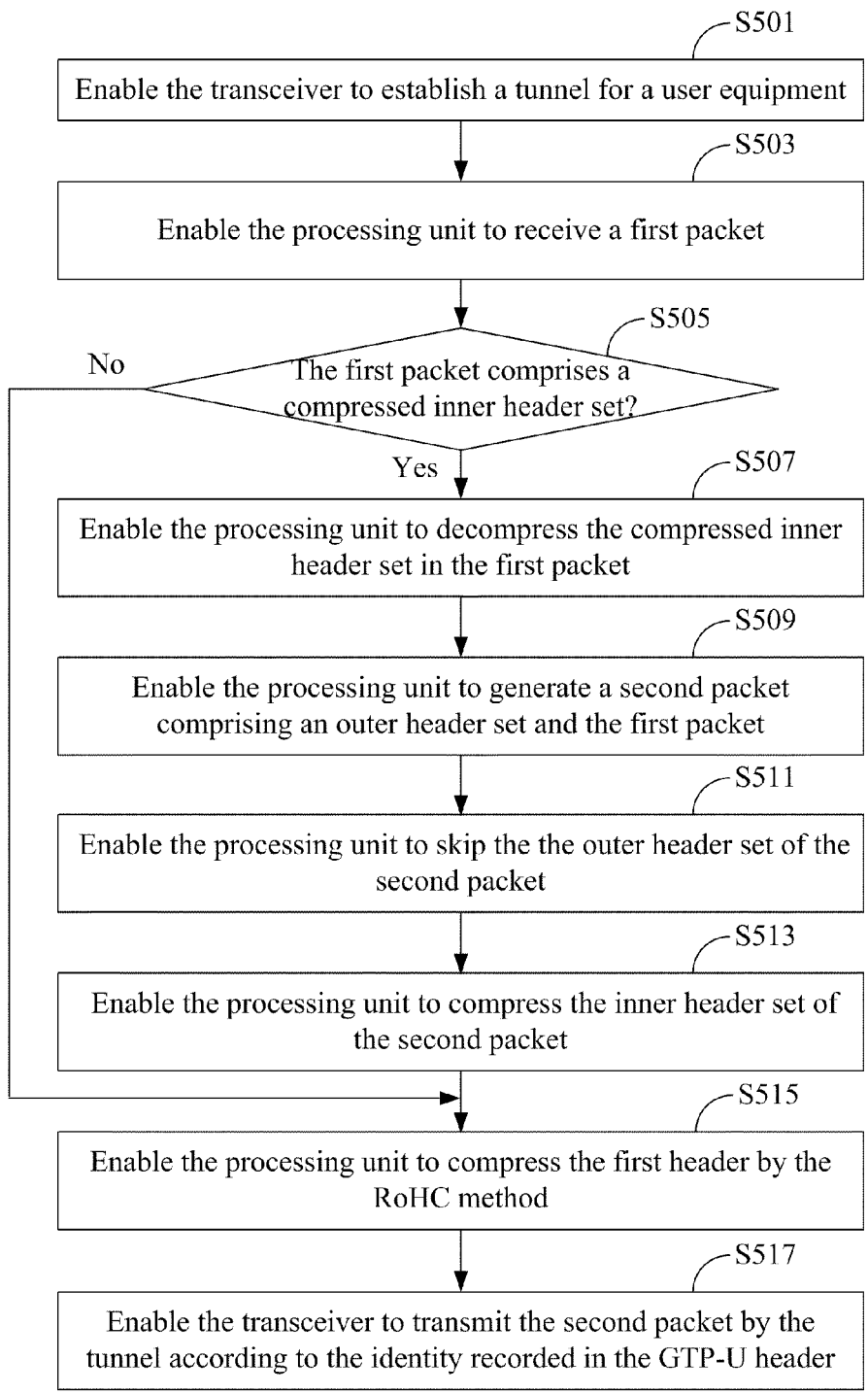
FIG. 5A illustrates a flowchart of the fifth embodiment.

A fifth embodiment of the present invention is a header compression method, which can be used in a wireless communication apparatus, such as the relay station 23 and the base station 25 in the second embodiment. The wireless communication apparatus comprises a processing unit and a transceiver. The flowchart of the header compression method is illustrated in FIG. 5A.

First, step S501 is executed to enable the transceiver to establish a tunnel for a user equipment. Next, step S503 is executed to enabling the processing unit to receive a first packet. Step S505 is executed to enable the processing unit to determine whether the first packet comprises the compressed inner header set. If it is yes in step S505, step S507 is executed next to enable the processing unit to decompress the compressed inner header set in the first packet. Afterwards, the header compression method executes step S509 to enable the processing unit to generate a second packet comprising an outer header set and the first packet. The outer header set is related to the wireless communication apparatus and comprises a first header and a GTP-U header. The GTP-U header records an identity corresponding to a data flow of the user equipment.

The header compression method then executes step S511 to skip the outer header of the second packet. Next, step S513 is executed to enable the processing unit to compress the inner header set of the second packet. After the step S513, the header compression method executes step S515 to compress the first header by the RoHC method. If it is no in step S505, the header compression method proceeds to step S515 directly. Finally, the header compression method executes step S517 to enable the transceiver to transmit the second packet by the tunnel according to the identity recorded in the GTP-U header.

Similarly, when the wireless communication system conforms to the LTE standard, the tunnel is a GTP-U tunnel, the outer header set comprises at least one of an IP header, a UDP header, a GTP-U header, and the combination thereof and the inner header set comprises at least one of an IP header, a UDP header, an RTP header, and the combination thereof.

In addition to the aforesaid steps, the fifth embodiment can also execute all the compression operations set forth in the second embodiment. How the fifth embodiment executes these operations will be readily appreciated by those of ordinary skill in the art based on the explanation of the second embodiment, and thus will not be further described herein.

Figure 5B:
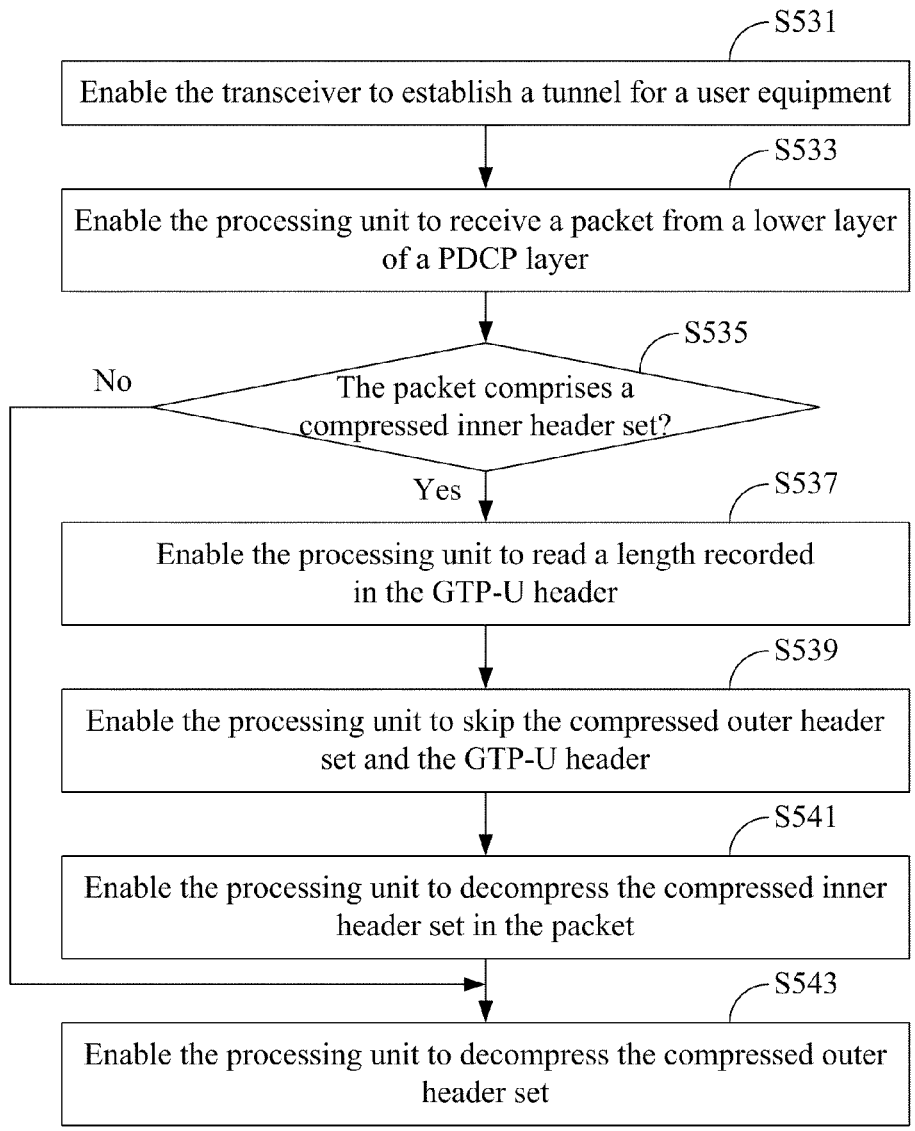
FIG. 5B illustrates a flowchart of the sixth embodiment.

A sixth embodiment of the present invention is a header decompression method, which can be used in a wireless communication apparatus comprising a processing unit and a transceiver, such as the relay station 23 and the base station 25 in the second embodiment. The header decompression method corresponds to the header compression method in the fifth embodiment and its flowchart is illustrated in FIG. 5B.

First, the header decompression method executes step S531 to enable the transceiver to establish a tunnel for a user equipment. Next, step S533 is executed to enable the processing unit to receive a packet from a lower layer of a PDCP layer, wherein the packet comprises an RoHC header, a compressed outer header set, and a GTP-U header. The GTP-U header records an identity corresponding to a data flow of the user equipment.

Following that, the header decompression method executes step S535 to enable the processing unit to determine whether the packet comprises a compressed inner header set. If it is yes, step S537 is executed to enable the processing unit to read a length recorded in the GTP-U header. Next, step S539 is executed to enable the processing unit to skip the GTP-U header according to the length of the GTP-U header. Then, step S541 is executed to enable the processing unit to decompress the compressed inner header set in the packet.

Afterwards, the header decompression method executes step S543 to enable the processing unit to decompress the compressed outer header set according to the RoHC header. If it is no in step S535, the header decompression method proceeds to step S543 directly.

If the wireless communication system conforms to the LTE standard, the tunnel is a GTP-U tunnel, the outer header set comprises at least one of an IP header, a UDP header, a GTP-U header, and the combination thereof and the inner header set comprises at least one of an IP header, a UDP header, an RTP header, and the combination thereof.

In addition to the aforesaid steps, the sixth embodiment can also execute all the decompression operations set forth in the second embodiment. How the sixth embodiment executes these operations will be readily appreciated by those of ordinary skill in the art based on the explanation of the second embodiment, and thus will not be further described herein.

Although the wireless communication systems in the aforementioned embodiments conform to the LTE standard, people skilled in the art should be able to apply the present invention to a wireless communication system conforming to other wireless communication standards. The key idea of the present invention is to figure out the fields in the outer header set that can be obtained once a tunnel is established or can be inferred once a compressed packet is received. A replaced header in the present invention ignores these kinds of information and includes only necessary information. The alternative approach of the present invention does not use a replaced header but compresses the outer header set by the RoHC method. Although the outer header set is compressed, the GTP-U header is not compressed because it carries necessary information. The present invention also provides a skip mechanism so as to skip the outer header set and then compresses the inner header set. Consequently, the burden on the radio link between the relay station and the base station can be reduced.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A header compression method for use in a wireless communication apparatus, the wireless communication apparatus comprising a processing unit and a transceiver, the header compression method comprising the steps of:
   (a) enabling the transceiver to establish a tunnel for a user equipment;
   (b) enabling the processing unit to receive a first packet, the first packet comprises a compressed inner header set and a payload;

(c) enabling the processing unit to decompress the compressed inner header set in the first packet;
(d) enabling the processing unit to generate a second packet comprising an outer header set, the first packet, the outer header set being related to the wireless communication apparatus;
(e) enabling the processing unit to replace the outer header set of the second packet with a replaced header, the replaced header being shorter than the outer header set, recording an identity corresponding to a data flow of the user equipment and a length of the replaced header, and being generated by ignoring fields in the outer header set obtained once the tunnel is established or inferred once a compressed packet is received;
(f) enabling the processing unit to skip the replaced header of the second packet according to the length of the replaced header;
(g) enabling the processing unit to compress the inner header set of the second packet; and
(h) enabling the transceiver to transmit the second packet by the tunnel according to the identity recorded in the replaced header.

2. The header compression method of claim 1, further comprising the step of:
enabling the processing unit to determine that the first packet comprises the compressed inner header set.

3. The header compression method of claim 1, wherein the replaced header is a GPRS Tunneling Protocol-User Plane (GTP-U header) conforming to the Long Term Evolution (LTE) standard.

4. The header compression method of claim 1, wherein the tunnel is a GTP-U tunnel, the outer header set comprises at least one of an Internet Protocol (IP) header, a User Datagram Protocol (UDP) header, a GTP-U header, and the combination thereof, and the inner header set comprises at least one of an IP header, a UDP header, a Real Time Protocol (RTP) header, and the combination thereof, and the header compression method further comprises a step of enabling the transceiver to transmit a Radio Resource Control (RRC) signal carrying a message type of the GTP-U header.

5. A header compression method for use in a wireless communication apparatus, the wireless communication apparatus comprising a processing unit and a transceiver, the header compression method comprising the steps of:
(a) enabling the transceiver to establish a tunnel for a user equipment;
(b) enabling the processing unit to receive a first packet comprising a compressed inner header set and a payload;
(c) enabling the processing unit to decompress the compressed inner header set in the first packet;
(d) enabling the processing unit to generate a second packet comprising an outer header set and the first packet, the outer header set being related to the wireless communication apparatus and comprising a first header and a GTP-U header, the GTP-U header recording a length of the GTP-U header and an identity corresponding to a data flow of the user equipment;
(e) enabling the processing unit to compress the first header by Robust Header Compression (RoHC) method;
(f) enabling the processing unit to skip the outer header set of the second packet according to the length of the GTP-U header;
(g) enabling the processing unit to compress the inner header set of the second packet by RoHC method; and
(h) enabling the transceiver to transmit the second packet by the tunnel according to the identity recorded in the GTP-U header.

6. The header compression method of claim 5, further comprising the step of:
enabling the processing unit to determine that the first packet comprises the compressed inner header set.

7. The header compression method of claim 5, wherein the tunnel is a GTP-U tunnel, the outer header set comprises at least one of an IP header, a UDP header, a GTP-U header, and the combination thereof and the inner header set comprises at least one of an IP header, a UDP header, an RTP header, and the combination thereof.

8. A header decompression method for use in a wireless communication apparatus, the wireless communication apparatus comprising a processing unit and a transceiver, the header decompression method comprising the following steps of:
(a) enabling the transceiver to establish a tunnel for a user equipment;
(b) enabling the processing unit to receive a packet from a lower layer of a PDCP layer, the packet comprising a replaced header, a compressed inner header set, and a payload, the replaced header recording an identity of a data flow of the user equipment and being generated by ignoring fields in the outer header set obtained once the tunnel is established or inferred once a compressed packet is received;
(c) enabling the processing unit to read the identity recorded in the replaced header;
(d) enabling the processing unit to read the length recorded in the replaced header;
(e) enabling the processing unit to skip the replaced header according to the length of the replaced header;
(f) enabling the processing unit to decompress the compressed inner header set in the packet; and
(g) enabling the processing unit to generate an outer header set of the packet from the replaced header according to the identity, wherein the replaced header is shorter than the outer header set.

9. The header decompression method of claim 8, further comprising the step of:
enabling the processing unit to determine that the packet comprises the compressed inner header set.

10. The header decompression method of claim 8, wherein the replaced header is a GTP-U header conforming to the LTE standard.

11. The header decompression method of claim 8, wherein the tunnel is a GTP-U tunnel, the outer header set comprises at least one of an IP header, a UDP header, a GTP-U header, and the combination thereof and the inner header set comprises at least one of an IP header, a UDP header, an RTP header, and the combination thereof, and the header decompression method further comprises a step of receiving an RRC signal carrying a message type of the GTP-U header.

12. A header decompression method for use in a wireless communication apparatus, the wireless communication apparatus comprising a processing unit and a transceiver, the header decompression method comprising the steps of:
enabling the transceiver to establish a tunnel for a user equipment;
enabling the processing unit to receive a packet from a lower layer of a PDCP layer, the packet comprising an RoHC header, a compressed outer header set, a GTP-U header, a compressed inner header set, and a payload, the GTP-U header recording a length of the GTP-U header and an identity corresponding to a data flow of the user equipment;

enabling the processing unit to read the length recorded in the GTP-U header;

enabling the processing unit to skip the compressed outer header set and the GTP-U header according to the length of the GTP-U header;

enabling the processing unit to decompress the compressed inner header set in the packet, wherein the compressed inner header set is compressed by RoHC method; and enabling the processing unit to decompress the compressed outer header set according to the RoHC header.

13. The header decompression method of claim 12, further comprising the step of:

enabling the processing unit to determine that the packet comprises the compressed inner header set.

14. The header decompression method of claim 12, wherein the tunnel is a GTP-U tunnel, the outer header set comprises at least one of an IP header, a UDP header, a GTP-U header, and the combination thereof and the inner header set comprises at least one of an IP header, a UDP header, an RTP header, and the combination thereof.

15. A wireless communication apparatus, comprising:

a transceiver being configured to establish a tunnel for a user equipment; and a processing unit being configured to receive a first packet, decompress a compressed inner header set in the first packet, generate a second packet comprising the first packet and an outer header set related to the wireless communication apparatus, replace the outer header set of the second packet with a replaced header, skip the replaced header of the second packet according to a length of the replaced header, and compress the inner header set of the second packet, wherein the replaced header is shorter than the outer header set, records the length of the replaced header and an identity corresponding to a data flow of the user equipment, and is generated by ignoring fields in the outer header set obtained once the tunnel is established or inferred once a compressed packet is received, wherein the first packet comprises the compressed inner header set and a payload and the transceiver is further configured to transmit the second packet by the tunnel according to the identity recorded in the replaced header.

16. The wireless communication apparatus of claim 15, wherein the processing unit is further configured to determine that the first packet comprises the compressed inner header set.

17. The wireless communication apparatus of claim 15, wherein the replaced header is a GTP-U header conforming to the LTE standard.

18. The wireless communication apparatus of claim 15, wherein the tunnel is a GTP-U tunnel, the outer header set comprises at least one of an IP header, a UDP header, a GTP-U header, and the combination thereof and the inner header set comprises at least one of an IP header, a UDP header, an RTP header, and the combination thereof, and the transceiver is further configured to transmit an RRC signal carrying a message type of the GTP-U header.

19. A wireless communication apparatus, comprising:

a transceiver being configured to establish a tunnel for a user equipment;

a processing unit being configured to receive a first packet comprising a compressed inner header set and a payload, decompress the compressed inner header set in the first packet, generate a second packet comprising an outer header set and the first packet, wherein the outer header set is related to the wireless communication apparatus and comprises a first header and a GTP-U header, the GTP-U header recording a length of the GTP-U header and an identity corresponding to a data flow of the user equipment, wherein the processing unit is further configured to compress the first header by RoHC method, skip the outer header set of the second packet according to the length of the GTP-U header, and compress the inner header set of the second packet by RoHC method and the transceiver is further configured to transmit the second packet by the tunnel according to the identity recorded in the GTP-U header.

20. The wireless communication apparatus of claim 19, wherein the processing unit is further configured to determine that the first packet comprises the compressed inner header.

21. The wireless communication apparatus of claim 19, wherein the tunnel is a GTP-U tunnel, the outer header set comprises at least one of an IP header, a UDP header, a GTP-U header, and the combination thereof and the inner header set comprises at least one of an IP header, a UDP header, an RTP header, and the combination thereof.

22. A wireless communication apparatus, comprising:

a transceiver being configured to establish a tunnel for a user equipment;

a processing unit being configured to receive a packet from a lower layer of a PDCP layer, wherein the packet comprises a replaced header, a compressed inner header set, and a payload, the replaced header records an identity of a data flow of the user equipment, and the replaced header is generated by ignoring fields in the outer header set obtained once the tunnel is established or inferred once a compressed packet is received, wherein the processing unit is further configured to read the identity recorded in the replaced header, read the length recorded in the replaced header, skip the replaced header according to the length of the replaced header, decompress the compressed inner header set in the packet, and generate an outer header set of the packet from the replaced header according to the identity, wherein the replaced header is shorter than the outer header set.

23. The wireless communication apparatus of claim 22, wherein the processing unit is further configured to determine that the packet comprises the compressed inner header set.

24. The wireless communication apparatus of claim 22, wherein the replaced header is a GTP-U header conforming to the LTE standard.

25. The wireless communication apparatus of claim 22, wherein the tunnel is a GTP-U tunnel, the outer header set comprises at least one of an IP header, a UDP header, a GTP-U header, and the combination thereof and the inner header set comprises at least one of an IP header, a UDP header, an RTP header, and the combination thereof, and the transceiver is further configured to receive an RRC signal carrying a message type of the GTP-U header.

26. A wireless communication apparatus, comprising:

a transceiver being configured to establish a tunnel for a user equipment; and a processing unit being configured to receive a packet from a lower layer of a PDCP layer, wherein the packet comprises an RoHC header, a compressed outer header set, a GTP-U header, a compressed inner header set, and a payload, and the GTP-U header records a length of the GTP-U header and an identity corresponding to a data flow of the user equipment, wherein the processing unit is further configured to read the length recorded in the GTP-U header, skip the compressed outer header set and the GTP-U header according to the length of the GTP-U header, decompress the compressed inner header set, and decompress the compressed outer header set according to the RoHC header, wherein the compressed inner header set is compressed by RoHC method.

27. The wireless communication apparatus of claim 26, wherein the processing unit is further configured to determine that the packet comprises the compressed inner header set.

28. The wireless communication apparatus of claim 26, wherein the tunnel is a GTP-U tunnel, the outer header set comprises at least one of an IP header, a UDP header, a GTP-U header, and the combination thereof and the inner header set comprises at least one of an IP header, a UDP header, an RTP header, and the combination thereof.

* * * * *